United States Patent Office

3,309,384
Patented Mar. 14, 1967

3,309,384
PREPARATION OF LOW VISCOSITY EPOXIDE
RESINS
David A. Shimp and John E. Kuhn, Louisville, Ky., assignors, by mesne assignments, to Celanese Coatings Company, a corporation of Delaware
No Drawing. Filed June 15, 1965, Ser. No. 464,220
7 Claims. (Cl. 260—348.6)

This application is a continuation-in-part of our application Ser. No. 141,961, filed Oct. 2, 1961, now abandoned.

This invention pertains to improved epoxide resins, more particularly to low viscosity monomeric glycidyl polyethers of bisphenol.

One method for preparing diglycidyl polyethers of bisphenol — bis(4 - hydroxyphenyl)dimethylmethane—has been to react an epihalohydrin with bisphenol using a ratio of ten mols of epihalohydrin to one mol of bisphenol. While theoretically two mols of epihalohydrin per mol of bisphenol would appear to be sufficient, higher yields of the monomeric diglycidyl ether are obtained with an excess of epihalohydrin. By this usual method, the epihalohydrin and bisphenol are reacted at temperatures from 105° C. to 120° C. using two mols of caustic alkali per mol of bisphenol, the caustic alkali generally being added incrementally during the course of the reaction. Caustic alkali is usually employed as an aqueous solution unless at least a trace of water, say 1 percent is present. After several hours the organic layer of the reaction product is separated, washed, dried with sodium sulfate and fractionally distilled under vacuum.

In recent years, considerable work has been directed toward the preparation of epoxide resins due to the fact that the caustic alkali (that is sodium or potassium hydroxide) has been found to play a dual role in the process. In addition to its use as a dehydrohalogenation agent, the caustic alkali functions as a catalyst in promoting the condensation of the bisphenol with the epihalohydrin. While various mechanisms have been described for this condensation reaction, the dihalohydrin ether of bisphenol is ultimately formed. The second reaction is the dehydrohalogenation reaction whereby the halohydrin groups of the halohydrin ether are converted to epoxide groups.

Preparation of diglycidyl ethers, thus, is essentially a two-step process, that is, a process involving both a condensation reaction and a dehydrohalogenation reaction. At elevated temperatures both of these reactions take place concomitantly. Caustic alkali when added to a system under these conditions, acts as a catalyst for the first reaction and as a reactant in the second reaction. In other words, the caustic alkali catalyzes the bisphenol-epihalohydrin condensation reaction, and it reacts with the halohydrin ether formed, this reactivity resulting in dehydrohalogenating the halohydrin ether to form the glycidyl ether.

Several processes have been proposed for taking advantage of the two stage mechanism, such processes involving low temperature operation where the two reactions do not occur simultaneously. One such process is described in U.S. 2,943,095. This process is based on the discovery that the first stage reaction should be conducted at temperatures not in excess of 45° C., and preferably at reaction temperatures below 35° C., since the lower reaction temperature, the higher the ultimate yield of monomeric glycidyl ethers. U.S. 2,943,095 describes a process for preparing monomeric glycidyl ethers of bisphenol wherein from 0.02 to 0.1 equivalent alkali metal hydroxide per phenolic hydroxyl group is employed in a low temperature first stage reaction of bisphenol with the epihalohydrin. At the end of the first stage glycerol dihalohydrin formed is reconverted to epihalohydrin by the use of 50 to 70 percent of the stoichiometric amount of alkali metal hydroxide required for complete dehydrohalogenation. In the second stage, the excess epihalohydrin is removed by distillation and dehydrohalogenation is completed by the addition of the remainder of the stoichiometric amount of alkali at 55° C. to 65° C.

While the process of U.S. 2,943,095 makes efficient use of epihalohydrin and catalyst, it is not completely satisfactory from a commercial point of view. One disadvantage is that the time required to complete the first stage reaction is about 72 hours. This is impracticably long for such a process in plant operation. In accordance with this invention, the first stage reaction is completed in 2 to 5 hours rather than 72 hours; yet by the process monomeric glycidyl polyethers of bisphenol having viscosities less than 10,000 centipoises at 25° C. can be made in this 2 to 5 hour period rather than in 72 hours.

At temperatures of 85° C., or slightly higher, the dehydrohalogenation reaction assumes a progressively larger role in the reaction mechanism. However, we have found that if a critical level of caustic is maintained and if the subsequent dehydrohalogenation reaction is carried out in excess epihalohydrin, the condensation reaction temperature can be increased from 62° C. to say, 85° C., and consequently the condensation reaction time can be shortened to two to five hours. If the temperature is held in a 62° C. to 85° C. range, the dehydrohalogenation taking place does not adversely affect the final composition. In other words, while some dehydrohalogenation takes place, it is not extensive enough so that resulting epoxide groups formed are sufficiently abundant to react with free phenolic hydroxyl groups. Stated in still another way, the dehydrohalogenation reaction does not prevent the phenol-epihalohydrin reaction from proceeding virtually to completion. While there are a few unreacted phenolic hydroxyl groups, the number, when statistically compared with the number of epoxide groups, is so small that the reaction is not adversely affected by polymer formation. The presence of these free phenolic hydroxyl groups could lead to polymer formation during the second stage reaction, that is, during the dehydrohalogenation reaction. However, in accordance with this invention, this dehydrohalogenation reaction is carried out in the presence of sufficient epihalohydrin so that epihalohydrin rather than epoxide groups react with the free phenolic hydroxyl groups in this second stage. This reaction of epihalohydrin with phenolic hydroxyl groups is assured because of the excess of halohydrin. Because more epihalohydrin than epoxide is present, phenolic hydroxyl groups have a greater affinity for epihalohydrin than for epoxides.

According to the practice of this invention in the critical first stage, at the temperature of 62° C. to 85° C., a portion of the caustic alkali, that is 1.5 to 16 percent of the total per hour is introduced uniformly over at least a two hour period to maintain the caustic level. The total caustic is the stoichiometric quantity, that is, two mols of sodium or potassium hydroxide per mol of bisphenol, and by "uniformly" is meant that the caustic alkali is introduced either continuously throughout the period or in at least two and preferably four or more equal increments per hour, or any combination of continuous and incremental addition. After the two hour condensation reaction period, the catalyst addition rate is not as critical and larger or smaller quantities can be added at regular or irregular intervals. It is preferred, however, uniformly to introduce the caustic alkali over a four hour period. The uniform introduction of catalysts can be continued for five hours; however, this is advantageous only if it is desired to operate at a temperature in the lower end of the temperature range, for instance, at a temperature of 62° C. to 70° C. At these lower temperatures, using a given amount of catalyst, the bisphenol-epihalohydrin condensation reaction proceeds much further before the catalyst is consumed by dehydrohalogenation. At higher temperatures within the range, say from above 70° C. to 85° C., the condensation reaction takes place faster. Less reaction time is required for the condensation. But at these high temperatures, the dehydrohalogenation reaction also increases thereby consuming the catalyst. Thus, while the optimum rate could be increased at higher temperatures because of the increased speed of the condensation reaction, the optimum rate is actualy somewhat lower. The lower optimum rate is preferred because addition at this lower rate does not also permit the dehydrohalogenation reaction to proceed rapidly, to produce more glycidyl polyether which would subsequently lead to polymer formation. When over 50 percent of the total caustic is added at low temperatures, particularly in a four or five hour period, the extent of conversion of excess epihalohydrin to glycerin becomes excessively high.

At any given temperature in the 62° C. to 85° C. range, there is also a rate-time relationship. In this instance, the rate varies directly with time at a fixed temperature. In other words, the optimum hourly catalyst addition rate is higher for four and five hour condensation reaction periods than is desirable for two and three hour condensation reaction periods. Thus, for a two hour reaction period, a rate in the low end of the range, say 1.5 to 8 percent per hour, is advantageous, whereas when the condensation reaction is to be run for four and five hours, a catalyst addition rate of 8 to 16 percent per hour is desirable. Thus, for a two hour condensation reaction period, at 66° C., it is preferred to introduce caustic at a rate of 1.5 percent per hour, whereas at four hours the preferred rate is 12.5 percent per hour. Likewise, considering a four hour period, the optimum rate is 12.5 percent per hour at 66° C. whereas at 85° C., the preferred rate is 6.25 percent per hour.

According to this invention, therefore, in the well-known process for the preparation of monomeric glycidyl polyethers of bisphenol wherein an epihalohydrin and bisphenol are reacted at temperatures to 120° C., using epihalohydrin in excess, for instance, in an epihalohydrin bisphenol ratio of about 10 to 1 or more, and using two mols of a caustic alkali catalyst per mol of bisphenol and at least a trace of water, an improvement is provided for preparing monomeric glycidyl polyethers having viscosities of less than 10,000 centipoises at 25° C. The improvement includes maintaining a reaction temperature in the range of 62° C. to 85° C., introducing a portion of the caustic alkali uniformly during each of the first two hours of reaction at a rate of 1.5 to 16 percent of the total per hour, removing the water from the product, and dehydrohalogenating said reaction product in remaining excess epihalohydrin using the unadded portion of the total caustic alkali as the dehydrohalogenating agent. The process contemplated herein is essentially a two-stage process since there is a second separate dehydrohalogenation stage. Nevertheless, not only is the first stage carried out at a higher temperature than that contemplated by U.S. 2,943,095, but in addition, the epihalohydrin is not removed by distillation prior to dehydrohalogenation as in the prior art process.

By this invention, after the first stage reaction, water is removed from the reaction product by azeotropic distillation with a portion of the epihalohydrin. Some dehydrohalogenation, as described hereinbefore, will have taken place during the first stage. The water-free material is now completely dehydrohalogenated without the removal of the remaining excess epihalohydrin. Normally, when 50 percent of the total caustic alkali is used in the first stage as a 50 percent aqueous caustic solution, there will be about three mols of epihalohydrin per initial phenolic hydroxyl group remaining for the second stage, and the material is dehydrohalogenated in the presence of this epihalohydrin. It will be seen, however, that it is possible to use more dilute caustic, and in some instances water is added during the first stage reaction. In these instances after the removal of water by azeotropic distillation, an insufficient amount of epihalohydrin may remain. If this is the case, additional epihalohydrin is added since it is desired that epihalohydrin be present in the second stage to the extent of at least three mols per initial phenolic hydroxyl group. By "initial phenolic hydroxyl group" is meant the number of phenolic hydroxyl groups employed in the first stage or condensation reaction. If at least three mols of epihalohydrin per initial phenolic hydroxyl group are not present at the beginning of the second stage, additional epihalohydrin is added. We prefer at least four mols of epihalohydrin per initial phenolic hydroxyl group. The dehydrohalogenation reaction is then carried out following the known procedure, and the resin is purified in the usual manner which includes removing the salt by water washing, dissolution of the resin in a ketone, neutralization and solvent stripping. If an extremely low chlorine content resin is desired, the resin while dissolved in the ketone, is treated with dilute caustic.

Whereas, the caustic alkali is generally employed as an aqueous solution in the preparation of glycidyl polyethers, we can also add flake caustic to a bisphenol-epihalohydrin mixture containing at least 1 percent water based on the epihalohydrin. When excess epihalohydrin from a previous run is recovered and reused the 1 percent water based on the epihalohydrin normally will be carried over by the epihalohydrin and thereby will be present in the reaction mixture. Sufficient water is necessary at the beginning of the condensation reaction to permit the catalyst more readily to enter the system. Otherwise the water content during caustic alkali addition has little effect on the product viscosity and any concentration of caustic from flake to 50 or higher percent aqueous solutions will produce low viscosity resins. The epihalohydrin employed in the process is normally epichlorhydrin, however, epibromohydrin and epiiodohydrin are also contemplated.

As indicated, the dehydrohalogenation of the dihalohydrin ether intermediate is completed by reaction with aqueous caustic alkali in the conventional manner, except, as noted, the excess epihalohydrin is still present. The halohydrin ether-epihalohydrin solution is mixed with the caustic alkali under usual dehydrohalogenation conditions for instance, temperatures of 50° C. to 125° C. and reaction periods of two minutes to two hours to form the glycidyl polyether. If desired, a slight excess caustic alkali can be employed to convert any glycerol dihalohydrin formed to epihalohydrin. The product is then purified as described hereinbefore.

The preparation of low viscosity monomeric glycidyl polyethers of bisphenol can best be illustrated by reference to the following specific example and tables which are, of course, illustrative only since many variations are possible, particularly in reaction rates, temperatures and reaction periods as previously set forth.

*Example 1*

In a reaction vessel equipped with agitator, thermometer, dropping funnel and reflux condenser 925 parts of epichlorhydrin (10 mols) and 228 parts of bisphenol A (1 mol) are heated with agitation to 66° C. while maintaining the temperature of the vessel contents at 65° C. to 67° C., 79.8 parts of a 50.1 percent solution of aqueous caustic soda are added slowly by means of the dropping funnel over a period of three hours and fifty minutes to the reaction mixture. A mild exotherm especially at the beginning of the addition will make the occasional use of cooling water around the reaction vessel necessary. After all the caustic soda has been added the vessel contents are held at 66° C. for an additional 10 minutes. The temperature of the reaction mixture is then raised to 99° C. and water is distilled off as a water-epichlorhydrin azetorope. When the temperature reaches 99° C., 41.1 parts of flake caustic is added to the vesesl contents over a period of 50 to 55 minutes while maintaining the temperature at 96° C. to 99° C. This temperature is maintained for an additional ten minutes after the last addition. At the end of this time heat is applied to the vessel contents and excess epichlorhydrin is distilled off, raising the temperature gradually to 149° C. and then under vacuum (1.8 in. Hg) the temperature is raised to 160° C. The resulting resin is dissolved in 343 parts of methyl isobutyl ketone and washed with 372 parts of hot water. The salt water layer is drawn off and the resin is again washed. Additional flake caustic (18 parts) are added and the vessel contents heated with agitation at a temperature of 88° C. to 91° C. for one hour. Additional solvent is added (57.2 parts); the mother liquor is drawn off; the resin washed and then neutralized with 30 percent aqueous sulfuric acid and the separated water layer drawn off. The resin is dried by distilling off the solvent and water to 149° C. and then under vacuum (1.8 in. Hg) for 15 minutes to 160° C. The vessel contents are then filtered producing a resin having a weight per epoxide of 185, a viscosity of 8,000 centipoises at 25° C., and a hydrolyzable chlorine content of less than .1 percent.

To illustrate the effects of rate and amount of caustic addition, temperature, and water concentration the following tables are given. In these runs, except for Table VII where incremental additions of caustic are shown, the caustic has been added uniformly throughout the period of addition shown in the tables. The caustic is added dropwise during the reaction period. In addition, 50 percent aqueous solutions of caustic are employed unless otherwise designated. The percent total caustic and the rate of caustic addition figures are the percent of stoichiometric, that is, percent of a total of two mols of caustic per mol of bisphenol. Ep. eq. designates the epoxide equivalent of the product, epi recovery is the percent of exces of epichlorhydrin recoverd, and viscosity values are given in centipoise viscosity. A given run may appear on more than one table where the table is used to illustrate a different variable. So that it will be obvious which runs are so used, the runs have been designated by capital letters.

TABLE I.—EFFECT OF RATE OF CAUSTIC ADDITION AT LOW TEMPERATURES ON VISCOSITY

|  | Rate of Caustic Addition (Percent Total Caustic/Hr.) | Percent Total Caustic Added | Caustic Addition Period, Hrs. | Temp., ° C. | Viscosity (25.0° C.) | Ep. Eq. | Percent Epi Recovery |
|---|---|---|---|---|---|---|---|
| A | 12.5 | 12.5 | 1 | 66 | 10,960 | 186 | 98.22 |
| AA | 1.5 | 3.0 | 2 | 88 | 10,050 | 185 | 98.20 |
| C | 3.12 | 6.25 | 2 | 66 | 8,550 | 183 | 98.29 |
| B | 6.25 | 12.5 | 2 | 66 | 8,900 | 184 | 98.03 |
| D | 12.5 | 25.0 | 2 | 66 | 9,900 | 181 | 97.80 |
| DD | 16.0 | 32.0 | 2 | 62 | 9,900 | 187 | 97.50 |
| K | 20.0 | 50.0 | 2.5 | 66 | 11,400 | 188 | 97.70 |
| E | 3.1 | 12.5 | 4 | 66 | 9,500 | 186 | 97.79 |
| F | 6.25 | 25.0 | 4 | 66 | 9,500 | 185 | 98.33 |
| J | 6.25 | 25.0 | 4 | 85 | 8,180 | 181 | 97.94 |
| G | 12.5 | 50.0 | 4 | 66 | 8,420 | 185 | 97.33 |
| I | 12.5 | 50.0 | 4 | 85 | 9,800 | 187 | 97.75 |
| H | 16.0 | 64.0 | 4 | 85 | 9,500 | 186 | 95.40 |
| L | 20.0 | 80.0 | 4 | 66 | 12,140 | 191 | 94.89 |
| M | { ¹5.5<br>²63.5 | 16.5<br>63.5 | } 4 | 71 | 8,560 | 189 | 94.83 |

¹ Initial.
² Final.

TABLE II.—EFFECT OF CAUSTIC ADDITION TEMPERATURE ON VISCOSITY

|  | Temp. ° C. | Rate of Caustic Addition (Percent Total Caustic/Hr.) | Percent Total Caustic Added | Caustic Addition Period, Hrs. | Viscosity (25.0° C.) | Ep. Eq. | Percent Epi Recovery |
|---|---|---|---|---|---|---|---|
| R | 60 | 12.5 | 50 | 4 | 11,900 | 189 | 97.43 |
| Q | 63 | 12.5 | 50 | 4 | 9,880 | 187 | 97.28 |
| G | 66 | 12.5 | 50 | 4 | 8,420 | 185 | 97.33 |
| P | 71 | 12.5 | 50 | 4 | 9,020 | 186 | 96.89 |
| O | 79 | 12.5 | 50 | 4 | 9,420 | 187 | 97.25 |
| I | 85 | 12.5 | 50 | 4 | 9,800 | 187 | 97.75 |
| N | 91 | 12.5 | 50 | 4 | 11,260 | 187 | 97.43 |

TABLE III.—EFFECT OF THE TIME AT A FIXED CAUSTIC RATE AND TEMPERATURE ON THE VISCOSITY

|  | Percent Total Caustic Added | Rate of Caustic Addition (Percent Total Caustic/Hr.) | Caustic Addition Period, Hours | Temperature, ° C. | Viscosity (25.0° C.) | Ep. Eq. | Percent Epi Recovery |
|---|---|---|---|---|---|---|---|
| A | 12.5 | 12.5 | 1 | 66 | 10,960 | 186 | 98.22 |
| D | 25.0 | 12.5 | 2 | 66 | 9,900 | 181 | 97.80 |
| G | 50.0 | 12.5 | 4 | 66 | 8,420 | 185 | 97.33 |

TABLE IV.—EFFECT OF THE AMOUNT OF CAUSTIC ADDED AT A FIXED TEMPERATURE ON THE VISCOSITY WHEN THE ADDITION PERIOD IS HELD CONSTANT

|  | Percent Total Caustic Added | Temperature, ° C. | Addition Period, Hours | Rate of Caustic Addition (Percent Total Caustic/Hr.) | Viscosity (25.0° C.) | Ep. Eq. | Percent Epi Recovery |
|---|---|---|---|---|---|---|---|
| S | 3.12 | 66 | 4 | 0.78 | 11,840 | 186 | 97.90 |
| T | 6.25 | 66 | 4 | 1.56 | 9,600 | 185 | 98.08 |
| E | 12.5 | 66 | 4 | 3.10 | 9,500 | 186 | 97.79 |
| F | 25.0 | 66 | 4 | 6.25 | 9,500 | 185 | 98.33 |
| G | 50.0 | 66 | 4 | 12.5 | 8,420 | 185 | 97.33 |
| L | 80.0 | 66 | 4 | 20.0 | 12,140 | 191 | 94.98 |

TABLE V.—EFFECT OF THE WATER CONTENT OF CAUSTIC ADDED AT LOW TEMPERATURES

| | Concentration of Aqueous Caustic | Temp., °C. | Percent Total Caustic Added | Rate of Caustic Addition (Percent Total Caustic/Hr.) | Viscosity (25.0° C.) | Ep. Eq. | Percent Epi Recovery |
|---|---|---|---|---|---|---|---|
| G | 50 percent | 66 | 50 | 12.5 | 8,420 | 185 | 97.33 |
| U | 25 percent | 66 | 50 | 12.5 | 9,360 | 188 | 95.5 |
| V | 69 percent | 66 | 50 | 12.5 | 9,780 | 184 | 97.86 |
| W | Flake [1] | 66 | 50 | 12.5 | 9,220 | 184 | 97.60 |

[1] Percent water present in system based on epichlorhydrin.

TABLE VI.—EFFECT OF ADDITIONAL WATER IN EPI-BISPHENOL SOLUTION ON VISCOSITY

| | Initial Water Content (Weight Percent) | Final Water Content (Weight Percent) | Temp., °C. | Percent Total Caustic Added | Addition Period, Hrs. | Viscosity (25.0° C.) | Ep. Eq. | Percent Epi Recovery |
|---|---|---|---|---|---|---|---|---|
| G | 0.69 | 5.71 | 66 | 50 | 4 | 8,420 | 185 | 97.33 |
| Y | 5.19 | 9.40 | 66 | 50 | 4 | 8,760 | 186 | 95.87 |
| P | 0.69 | 5.71 | 71 | 50 | 4 | 9,020 | 186 | 96.89 |
| X | 5.19 | 9.40 | 71 | 50 | 4 | 9,040 | 188 | 96.62 |

TABLE VII.—MISCELLANEOUS COOKS EMPLOYING INCREMENTAL CAUSTIC ADDITIONS

| | Temp., °C. | Addition Period (Hrs.) | Initial Schedule of Incremental Additions | Percent Total Caustic Added At Initial Schedule | Final Sched. of Incremental Additions | Percent Total Caustic Added At Final Schedule | Initial Water Conc. (Wt. Percent) | Final Water Conc. (Wt. Percent) | Viscosity (25.0° C.) | WPE |
|---|---|---|---|---|---|---|---|---|---|---|
| M | 71 | 4 | 2.75 percent every 30 minutes. | 16.5 | 5.3 percent every 5 minutes. | 63.5 | 0.69 | 8.56 | 8,560 | 189 |
| Z | 71 | 4 | ...do... | 16.5 | ...do... | 63.5 | 0.69 | 8.56 | 8,760 | 186 |

All of the foregoing tables are based on first stage caustic additions. The dehydrohalogenation stage is subsequently carried out as set forth in Example 1.

Referring to the foregoing tables, Table I shows that the rate of caustic addition is very important in the production of low viscosity glycidyl polyethers of bisphenol. As the amount of caustic added in this first stage decreases, the rate must be lowered in order to produce the most desirable product. While the rate of 12.5 percent of the total caustic per hour is desirable for a four hour reaction period, a lower rate is desirable when a two hour period is used.

Table II illustrates the effect of temperature on product viscosity when a portion of the total caustic is introduced uniformly as a 50 percent aqueous solution. This table shows that at a temperature below 62° C., the viscosity approaches 10,000 centipoises. Also above 85° C., the viscosity again increases beyond 10,000 centipoises.

Table III illustrates the effect of time at a fixed caustic rate and at a fixed temperature. The table shows values obtained at the fixed caustic rate of 12.5 percent of the total per hour as the time is increased from four hours.

Table IV shows the effect of varying the rate of caustic addition with the time and temperature remaining fixed. For the four hour period a rate of 12.5 percent of the total caustic per hour appears to be the optimum addition rate.

Table V demonstrates that varying amounts of water introduced into the epichlorhydrin-bisphenol solution by changing the concentration of the aqueous caustic has a slight and irregular effect on product viscosity. The table also shows that when 1 percent water is present in the system, based on the epichlorhydrin, flake caustic can be used. While the presence of water has a slight effect on product viscosity, the presence of water does not affect the final material so greatly that its viscosity is greater than 10,000 centipoises. In other words, so long as the water is removed prior to dehydrohalogenation, the amount of water present is relatively immaterial. This is further illustrated by Table VI which shows the effect of water already present in the system, rather than that added with the caustic. Table VI shows very little difference in the product viscosities of two sets of products differing only in the initial water content of the epichlorhydrin-bisphenol solutions. Caustic added was in the form of a 50 percent aqueous solution. One set of products was made at 71° C. and the other at 66° C.

As indicated hereinbefore, it is preferred to add the caustic alkali uniformly throughout the reaction period. However, the rate can be changed during the first two hours so long as the rate of addition is continuous and is within the disclosed range. While the addition rate preferably is continuous as described for the foregoing runs, Table VII shows that the caustic can also be added in two or more equal increments per hour throughout the preferred reaction period, in other words, "uniformly."

Based on the preceding examples, it is readily seen that a novel process is provided for the preparation of monomeric glycidyl polyesters. Moreover, these glycidyl polyesters meet the present demand for low viscosity products.

We claim:

1. In the process for the preparation of monomeric glycidyl polyethers of bis(4-hydroxyphenyl) dimethylmethane which consists of reacting an epihalohydrin and bis(4-hydroxyphenyl) dimethylmethane through a catalytic condensation reaction and a dehydrohalogenation reaction to form the monomeric glycidyl polyethers using epihalohydrin in excess in an epihalohydrin-bis(4-hydroxyphenyl) ratio of at least 10:1, 2 mols of caustic alkali per mol of bis(4-hydroxyphenyl) dimethylmethane and at least a trace of water, the improvement for preparing said monomeric glycidyl polyhydric ethers having viscosities of less than about 10,000 centipoises of 25° C. which consists essentially of the two-step process of
   (1) maximizing the catalytic condensation reaction while concomitantly minimizing the accompanying caustic alkali dehydrohalogenation by
       (a) maintaining the reaction temperature in the range of 62° C. to 85° C.,
       (b) uniformly adding the caustic alkali at a rate of 1.5 to 16% of the total caustic per hour during a 2 to 5 hour reaction period, uniformly being at least two additions per hour including continuous additions,
(c) controlling the caustic alkali consumed by dehydrohalogenation during a given 2 to 5 hour reaction period by regulation of the catalyst addition rate in inverse relation to the temperature within the temperature range to form an intermediate reaction product,
(d) removing the water from the intermediate reaction product, and
(2) completing the dehydrohalogenation by reacting said intermediate reaction product in the presence of the excess epihalohydrin using the unadded portion of the total caustic alkali as the dehydrohalogenating agent.

2. In the process for the preparation of monomeric glycidyl polyethers of bis(4-hydroxyphenyl) dimethylmethane which consists of reacting an epihalohydrin and bis(4-hydroxyphenyl) dimethylmethane through a catalytic condensation reaction and a dehydrohalogenation reaction to form the monomeric glycidyl polyethers using epihalohydrin in excess in an epihalohydrin-bis(4-hydroxyphenyl) ratio of at least 10:1, 2 mols of caustic alkali per mol of bis(4-hydroxyphenyl) dimethylmethane and at least a trace of water, the improvement for preparing said monomeric glycidyl polyhydric ethers having viscosities of less than about 10,000 centipoises of 25° C. which consists essentially of the two-step process of
(1) maximizing the catalytic condensation reaction while concomitantly minimizing the accompanying caustic alkali dehydrohalogenation by
(a) maintaining the reaction temperature in the the range of 62° C. to 85° C.,
(b) uniformly adding the caustic alkali at a rate of 1.5 to 16% of the total caustic per hour during a 2 to 5 hour reaction period, uniformly being at least two additions per hour including continuous additions,
(c) controlling the caustic alkali consumed by dehydrohalogenation during a given 2 to 5 hour reaction period by regulation of the catalyst addition rate in inverse relation to the temperature within the temperature range to form an intermediate reaction product,
for a given reaction time within said reaction period, the caustic alkali hourly addition rate being in the upper half of the hourly uniform addition rate when the temperature is in the lower half of the temperature range, the caustic alkali addition rate being in the lower half of the hourly uniform addition rate when the temperature is in the upper half of the temperature range and for a given temperature within said temperature range the caustic alkali hourly addition rate being in the lower half of its range when the reaction period is in the shorter half of the 2 to 5 hour period, the caustic alkali hourly addition rate being in the upper half of its range when the reaction period is in the longer half of the 2 to 5 hour period,
(d) removing the water from the intermediate reaction product, and
(2) completing the dehydrohalogenation by reacting said intermediate reaction product in the presence of the excess epihalohydrin using the unadded portion of the total caustic alkali as the dehydrohalogenating agent.

3. The process of claim 2 wherein the epihalohydrin is epichlorhydrin, wherein the uniform caustic alkali introduction rate of 1.5 to 16 percent of the total per hour is continued for five hours.

4. The process of claim 2 wherein the epihalohydrin is epichlorhydrin, wherein the reaction temperature is 66° C., and wherein the caustic alkali is introduced at a rate of 12.5 percent of the total per hour for a period of four hours.

5. The process of claim 2 wherein the epihalohydrin is epichlorhydrin, wherein the reaction temperature is 80° C., and wherein the caustic alkali is introduced at a rate of 6.25 percent of the total per hour for a period of four hours.

6. The process of claim 2 wherein the epihalohydrin is epichlorhydrin, wherein the reaction temperature is 66° C., and wherein the caustic alkali is introduced at a rate of 1.5 percent of the total per hour for a period of two hours.

7. The process of claim 2 wherein the caustic alkali is added as a 50 percent aqueous sodium hydroxide solution, and wherein the dehydrohaloenation reaction is carried out in remaining excess epihalohydrin.

References Cited by the Examiner

UNITED STATES PATENTS

| | | | |
|---|---|---|---|
| 2,841,595 | 7/1958 | Pezzaglia | 260—348.6 |
| 2,943,095 | 6/1960 | Farnham | 260—348.6 |
| 2,943,096 | 6/1960 | Reinking | 260—348.6 |
| 2,965,652 | 12/1960 | Gaertner | 260—348.6 |
| 3,033,816 | 5/1962 | Price et al. | 260—348.6 |
| 3,069,434 | 12/1962 | Spence et al. | 260—348.6 |
| 3,074,974 | 1/1963 | Gebura | 260—348.6 |

FOREIGN PATENTS 1,112,528   8/1961   Germany.

WALTER A. MODANCE, *Primary Examiner.*

NORMA S. MILESTONE, *Assistant Examiner.*